Nov. 16, 1965  D. B. MAHOLM, JR  3,217,703
APPARATUS FOR USE IN THE FABRICATION OF DENTURES
AND SIMILAR ARTICLES
Filed Aug. 5, 1963
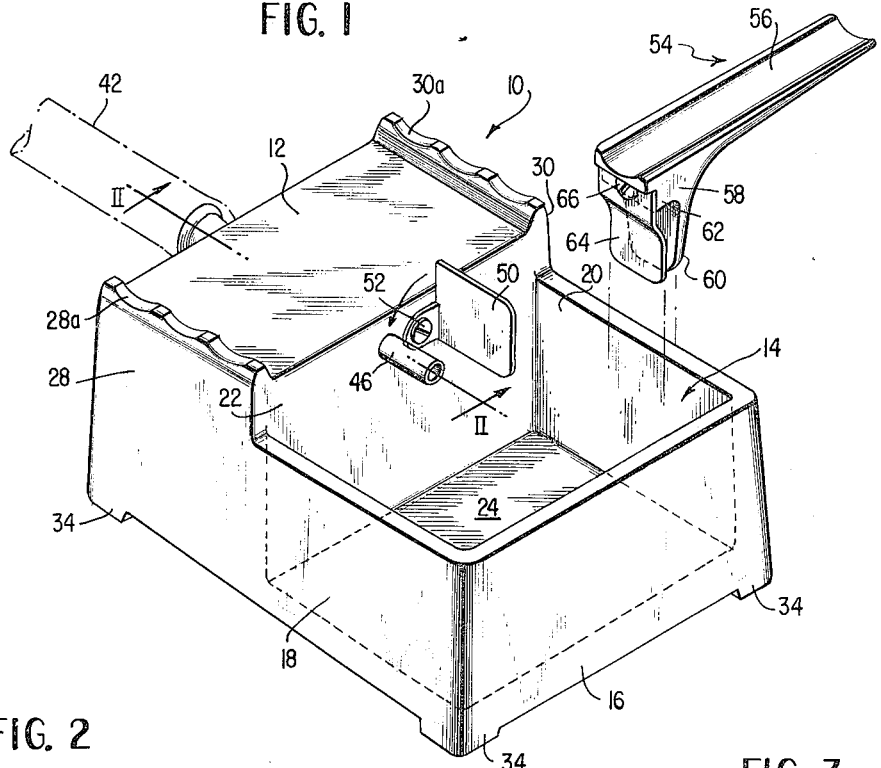
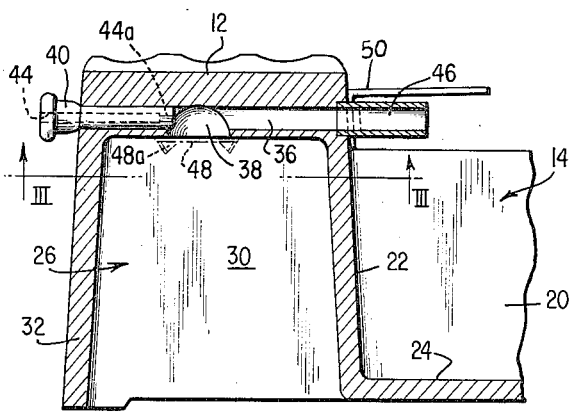
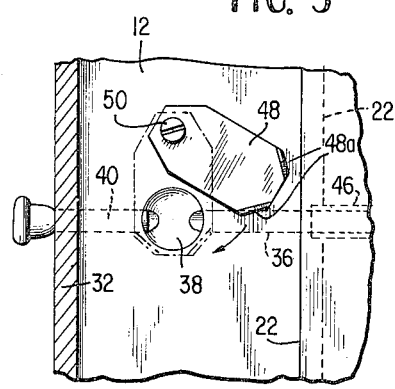
INVENTOR.
DONALD B. MAHOLM, JR.
BY
Browne, Schuyler, & Beveridge
ATTORNEYS.

3,217,703
APPARATUS FOR USE IN THE FABRICATION OF
DENTURES AND SIMILAR ARTICLES
Donald B. Maholm, Jr., 399 E. Main St., Alliance, Ohio
Filed Aug. 5, 1963, Ser. No. 299,937
3 Claims. (Cl. 126—343.5)

This invention relates to apparatus for use primarily by dentists and dental technicians in the fabrication of dentures and similar appliances, and in other laboratory activities wherein wax is employed in the making of molds and the like as a step in the fabrication of articles.

An object of this invention is to provide a wax container and heating apparatus for maintaining a quantity of wax at a working temperature.

Another object is to provide a compact assembly of implements for use in the fabrication of dentures and similar articles, in which a quantity of wax may be continuously maintained in a pliable condition and portions of this wax conveniently removed as desired.

A further object is to provide apparatus for simplifying the various operations required in the fabrication of dentures and like articles.

Still another object is to provide a combined wax container, heater and spatula holder for use in the fabrication of dentures and similar appliances in which the wax may be continuously warmed while in the container, while at the same time the spatula holder can be detachably mounted on the container in a readily accessible position.

The foregoing and other objects are achieved by the provision of a metal casting having a wax receiving chamber with a horizontal work supporting platform projecting from the upper edge of one wall of the chamber. Formed in the platform is a Bunsen burner passage, the outlet of which is disposed adjacent the upper edge of the wax receiving chamber. For shielding the burner flame from wax dropped from a spatula or the like and for dispersing and laterally spreading the flame from the burner, a shield is mounted on the chamber wall and extends laterally therefrom closely above the burner. An elongated spatula (not shown) used for removing portions of the wax from the chamber may be supported on an elongate spatula holder which is detachably supported on the edge of the chamber walls and which is so constructed that when mounted on a wall of the chamber, the end of the spatula will project over the burner flame to be heated thereby. Control of the burner is provided by a pivoted baffle which cooperates with an air inlet for communicating with a fuel passage to vary the mixture of air and fuel to the burner.

Other objects and advantages will become apparent from the following description taken in connection with the accompanying drawing in which:

FIG. 1 is a perspective view of apparatus embodying the invention in its preferred form with certain parts shown displaced to more clearly show other parts;

FIG. 2 is a partial sectional view taken on line 2—2 of FIG. 1;

FIG. 3 is a sectional view taken on lines 3—3 of FIG. 2; and,

FIG. 4 is a sectional detailed view.

With reference to FIG. 1, a container-heated body, preferably in the form of an aluminum casting, is identified generally by reference numeral 10. Casting 10 is formed with a horizontal platform or work surface 12 projecting rearwardly from the upper edge of the rear wall of a wax receiving chamber 14. Chamber 14 as formed by a front wall 16, side walls 18 and 20, a rear wall 22, and a bottom wall 24.

Rear wall 22 serves as a partition between chamber 14 and an inverted recess or cavity 26 (FIG. 2). Cavity 26 is provided with side walls 28 and 30, and rear end wall 32, each of which depend from platform 12. Side walls 28 and 30 constitute integrally formed extensions or continuations of side walls 18 and 20, respectively. The upper edges of walls 28 and 30 may project slightly above the upper surface of platform 12 and are preferably formed with a plurality of flutes or grooves 28a and 30a respectively. Projecting downwardly at each of the corners of body 10 is a supporting leg 34.

Formed in platform 12 is a horizontal passage 36 (FIGS. 2 and 3) which communicates with atmosphere through an air inlet opening 38 drilled in the lower surface of platform 12 intermediate the ends of passage 36. Mounted in the inlet end of passage 26 adjacent wall 32 is a nozzle 40 formed with an enlarged fitting adjacent its inlet which is adapted to be secured to the end of a flexible fuel conduit 42 shown in phantom lines in FIG. 1. Conduit 42 conducts fluid fuel from a fuel source (not shown) into nozzle 40. Nozzle 40 is formed with a passage 44 which terminates at an outlet orifice 44a.

Mounted in the outlet end of passage 36 at wall 22 is a tubular extension 46. As fuel flows from passage 44 through orifice 44a into passage 36, air is entrained through opening 48, and the resulting mixture of air and fuel emanates from extension 46 where it is ignited. Thus extension 46 constitutes the outlet or burner tip of a Bunsen burner, and positions the flame over the contents of chamber 14.

For controlling the mixture of fuel and air in passage 36, a plate-like baffle or valve element 48 is pivotally mounted on the lower surface of platform 12 by a conventional fastener 59. Consequently, the size of air inlet opening 38 can be varied by selectively adjusting the position of valve element 48 between the extreme positions shown in FIG. 3. Downwardly projecting tabs 48a are provided on the outer or free end of valve element 48 to assist in the manual actuation of valve 48.

In order to disperse and laterally spread the flame emanating from burner tip 46 to uniformly warm the wax in chamber 14, and in order to prevent extinguishment of the flame by dripping wax, a deflecting shield 50 is mounted on wall 22 and extends laterally therefrom closely above burner tip 46 by a conventional fastener 52. In FIG. 1 of the drawings, the shield 50 is shown displaced around fastener 52 in order to more clearly show the burner, with shield 50 being shown in its proper position in FIGS. 2 and 4.

Wax may be removed from chamber 14 by a conventional spatula (not shown). When not in use, the spatula is supported by a spatula holder 54 which is detachably mounted on either of the upper edges of walls 16, 18 or 20. Spatula holder 54 includes a blade portion 56 having a concave upper surface, a mounting portion 58 including a mounting leg 60 which is recessed from the portion 58 to form a shoulder 62, and a resilient spring clip 64 secured to mounting portion 58 by a conventional fastener 66. Spring clip 64 and leg 60 cooperate to resiliently, detachably mount spatula holder 54 along the upper edge of the chamber walls as shown in detail in FIG. 4. Platform 12 provides a work supporting surface for additional spatulus or other implements. Portions of wax may be dipped from the chamber by a heated spatula and then spread onto a mold or otherwise shaped or formed by a second cooled spatula. As the wax is removed from the chamber, shield 50 prevents hot wax from dripping onto the burner flame and extinguishing it. Furthermore, the heat from the flame is deflected toward the wax in chamber 14 and tends to warm it and maintain it in a pliable condition, while at the same time, the wax is not overheated as would be the case if the flame were applied to the bottom of chamber 14 as in conventional apparatus.

While a specific form of the invention has been illustrated and described it should be understood that the invention is not confined to the precise construction illustrated, and that various alterations can be made by those skilled in the art without departing from the scope or spirit of the invention.

What is claimed is:

1. Wax heating and working apparatus comprising, an open topped wax receiving chamber having front and rear walls, side walls, and a bottom wall,
   a burner outlet mounted in the rear wall near the upper edge thereof for connection with a source of fluid fuel,
   a horizontal platform projecting rearwardly from the upper edge of said rear wall,
   a fuel passage formed in said horizontal platform for conducting fuel to said burner outlet,
   and a deflecting shield projecting from said rear wall above the burner outlet for shielding said burner outlet against wax being dropped thereon and for deflecting heat from the burner flowing toward the bottom of the wax receiving chamber.

2. The apparatus defined in claim 1 further including, an opening in the lower surface of said horizontal platform communicating with said fuel passage, and a valve element pivotally mounted on the lower surface of the horizontal platform movable relative to said opening for controlling the mixture of fuel and air to said burner outlet.

3. The apparatus defined in claim 2 further including a spatula holder having one end detachably mounted on one of said walls for supporting a spatula with the free end of the spatula positioned adjacent the burner outlet to be heated by a flame emanating therefrom.

References Cited by the Examiner

UNITED STATES PATENTS

| | | | |
|---|---|---|---|
| 1,526,615 | 2/1925 | Stowell et al. | 126—343.5 X |
| 1,620,179 | 3/1927 | White | 263—2 |
| 1,652,524 | 12/1927 | Gauger et al. | 158—28 |
| 1,711,794 | 5/1929 | Kibele | 158—73 |
| 3,035,533 | 5/1962 | Hebert et al. | 158—113 X |

FOREIGN PATENTS

| | | |
|---|---|---|
| 132,266 | 7/1920 | Great Britain. |
| 321,217 | 5/1920 | Germany. |

JAMES W. WESTHAVER, *Primary Examiner.*